United States Patent
Shirley, Jr. et al.

(10) Patent No.: US 11,634,366 B2
(45) Date of Patent: Apr. 25, 2023

(54) PLANT GROWTH ENHANCER USING CARBON DIOXIDE TO INCREASE PLANT YIELD AND METHOD OF INCREASING PLANT YIELD

(71) Applicant: Innovations for World Nutrition, LLC, Florence, AL (US)

(72) Inventors: Arthur R. Shirley, Jr., Florence, AL (US); Melissa C. Hayes, Florence, AL (US)

(73) Assignee: INNOVATIONS FOR WORLD NUTRITION, LLC, Florence, AL (US)

( * ) Notice: Subject to any disclaimer, the term of this patent is extended or adjusted under 35 U.S.C. 154(b) by 24 days.

(21) Appl. No.: 17/227,706

(22) Filed: Apr. 12, 2021

(65) Prior Publication Data

US 2021/0323887 A1 Oct. 21, 2021

Related U.S. Application Data

(60) Provisional application No. 63/010,093, filed on Apr. 15, 2020.

(51) Int. Cl.
*C05D 7/00* (2006.01)
*C05G 3/40* (2020.01)

(52) U.S. Cl.
CPC ............. *C05D 7/00* (2013.01); *C05G 3/40* (2020.02)

(58) Field of Classification Search
None
See application file for complete search history.

(56) References Cited

U.S. PATENT DOCUMENTS

| 1,870,131 | A | | 8/1932 | Meier |
| 3,197,302 | A | | 7/1965 | MacBride |
| 3,506,432 | A | | 4/1970 | Arita |
| 4,003,160 | A | * | 1/1977 | Muller ............... A01G 7/02 |
| | | | | 435/255.2 |
| 4,026,695 | A | | 5/1977 | Young |
| 4,559,076 | A | | 12/1985 | Young |

(Continued)

FOREIGN PATENT DOCUMENTS

| BR | 409658 | 4/1934 |
| BR | 1287749 | 6/1972 |

(Continued)

OTHER PUBLICATIONS

Viktor. "The influence of root assimilated inorganic carbon on nitrogen acquisition/assimilation and carbon partitioning." New Phytol. 165, 1 (2005): 157-69.

(Continued)

*Primary Examiner* — Wayne A Langel
(74) *Attorney, Agent, or Firm* — Jeffrey S. Melcher; Melcher Patent Law PLLC (57) ABSTRACT

A plant growth enhancer including a source of carbon dioxide, a source of carbohydrate, and source of acid in an amount to provide increased retention of carbon dioxide in the soil. A method of enhancing the growth of plants by applying the plant growth enhancer to the soil containing the plant, the acid increasing retention of the carbon dioxide in the soil, and the plant exhibiting enhanced growth from the combination of the carbon dioxide and carbohydrate.

33 Claims, 2 Drawing Sheets

(56) References Cited

U.S. PATENT DOCUMENTS

| | | | |
|---|---|---|---|
| 4,571,256 | A | 2/1986 | Takagi |
| 5,044,117 | A | 9/1991 | Kuckens |
| 5,308,373 | A | 5/1994 | Moore |
| 5,338,551 | A | 8/1994 | Lajoie |
| 5,432,148 | A | 7/1995 | Winston |
| 5,443,835 | A | 8/1995 | Winston |
| 5,468,715 | A | 11/1995 | Joseph |
| 5,741,521 | A | 4/1998 | Knight |
| 5,849,060 | A | 12/1998 | Diping |
| 5,876,990 | A | 3/1999 | Reddy |
| 6,101,763 | A | 8/2000 | Aoki |
| 6,231,633 | B1 | 5/2001 | Hirano |
| 6,358,294 | B1 | 3/2002 | Latting |
| 6,387,145 | B1 | 5/2002 | Miele |
| 6,475,257 | B1 | 11/2002 | Baptist |
| 7,753,984 | B2 | 7/2010 | Liu |
| 7,776,124 | B2 | 8/2010 | Binder |
| 8,328,898 | B2 | 12/2012 | Liu |
| 8,609,145 | B2 | 12/2013 | Anderson |
| 8,883,677 | B2 | 11/2014 | Windhoevel |
| 8,940,074 | B2 | 1/2015 | Kuo |
| 8,979,970 | B2 | 3/2015 | Kucera |
| 9,174,885 | B2 | 11/2015 | Taulbee |
| 9,334,199 | B2 | 5/2016 | Kuo |
| 9,566,240 | B2 | 2/2017 | Burch |
| 9,682,894 | B2 | 6/2017 | Gabrielson |
| 2002/0174697 | A1 | 11/2002 | Reid |
| 2003/0061758 | A1* | 4/2003 | Wilson ............... A01M 13/006 43/124 |
| 2004/0200248 | A1* | 10/2004 | Kirkegaard ............... C05B 1/00 71/28 |
| 2006/0003893 | A1 | 1/2006 | Pursell |
| 2011/0113843 | A1 | 5/2011 | Mantelatto |
| 2011/0174032 | A1 | 7/2011 | Liu |
| 2012/0103039 | A1 | 5/2012 | Brucher |
| 2015/0305251 | A1 | 10/2015 | Eyres |
| 2016/0031763 | A1 | 2/2016 | Kim |
| 2016/0280613 | A1 | 9/2016 | Wickstrom |
| 2016/0332929 | A1 | 11/2016 | McKnight |
| 2017/0008812 | A1 | 1/2017 | Kim |
| 2017/0152195 | A1 | 6/2017 | Terenzio |
| 2017/0166488 | A1 | 6/2017 | Chaudhry |
| 2019/0185390 | A1 | 6/2019 | Shirley |
| 2020/0102457 | A1 | 4/2020 | Goldstein |
| 2020/0068785 | A1 | 5/2020 | Geiger |

FOREIGN PATENT DOCUMENTS

| | | | |
|---|---|---|---|
| CN | 1088562 | | 6/1994 |
| CN | 1089932 | | 7/1994 |
| CN | 1136028 | | 11/1996 |
| CN | 1141276 | | 1/1997 |
| CN | 1240777 | A | 1/2000 |
| CN | 1296934 | | 5/2001 |
| CN | 1400196 | A | 3/2003 |
| CN | 1408680 | A | 4/2003 |
| CN | 1122652 | | 10/2003 |
| CN | 1629107 | | 6/2005 |
| CN | 101157580 | | 4/2008 |
| CN | 101195547 | | 6/2008 |
| CN | 101781137 | | 7/2010 |
| CN | 102515905 | | 6/2012 |
| CN | 102515911 | | 6/2012 |
| CN | 10278356 | | 11/2012 |
| CN | 102936169 | | 2/2013 |
| CN | 103304292 | | 9/2013 |
| CN | 103518456 | | 1/2014 |
| CN | 103539526 | | 1/2014 |
| CN | 103539556 | | 1/2014 |
| CN | 03570420 | | 2/2014 |
| CN | 03708891 | | 4/2014 |
| CN | 104045437 | | 9/2014 |
| CN | 104086268 | | 10/2014 |
| CN | 104262018 | | 1/2015 |
| CN | 104496685 | | 4/2015 |
| CN | 104557312 | | 4/2015 |
| CN | 104591818 | | 5/2015 |
| CN | 104829358 | | 8/2015 |
| CN | 104829362 | | 8/2015 |
| CN | 104973929 | | 10/2015 |
| CN | 105347876 | | 2/2016 |
| CN | 105948892 | | 9/2016 |
| CN | 106316495 | | 1/2017 |
| CN | 106316532 | | 1/2017 |
| CN | 106576795 | | 4/2017 |
| CN | 106747771 | | 5/2017 |
| CN | 106818732 | | 6/2017 |
| CN | 107235814 | | 10/2017 |
| CN | 107266141 | A * | 10/2017 ............... C05D 7/00 |
| EP | 2716620 | | 9/2014 |
| FR | 1520587 | | 4/1968 |
| JP | 54130367 | | 10/1979 |
| JP | 5626796 | | 3/1981 |
| JP | H06105620 | | 4/1994 |
| WO | 9627288 | | 2/1996 |
| WO | 01/14285 | | 3/2001 |
| WO | 2009091570 | | 1/2009 |
| WO | WO 2014/091095 | A1 * | 6/2014 ............... A01N 53/00 |
| WO | 2014106424 | | 7/2014 |
| WO | 2017068038 | | 4/2017 |

OTHER PUBLICATIONS

Vuorinen. "Dark $CO_2$ fixation by roots of willow and barley in media with a high level of inorganic carbon." Journal of Plant Physiology. vol. 151, 4 (1997): 405-408.

Hernandez. "Different Bacterial Populations Associated with the Roots and Rhizosphere of Rice Incorporate Plant-Derived Carbon." Appl Environ Microbiol. vol. 81 (2015): 2244-2253.

Bugbee. "$CO_2$ crop growth enhancement and toxicity in wheat and rice." Adv. Space Res. vol 14, 11 (1994): 257-267.

Razzaque. "Effects of Nitrogen Fertilizer and Elevated $CO_2$ on Dry Matter Production and Yield of Rice Cultivars." Bangladesh J. Agril. Res. 34,2 (2009): 313-322.

Allen. "The $CO_2$ fertilization effect: higher carbohydrate production and retention as biomass and seed yield." Global climate change and agricultural production. direct and indirect effects, Chapter 39. (1996).

Brix. "Uptake and photosynthetic utilization of sediment-derived carbon by *Phragmites australis* (Cav.) Trin. ex Steudel." Aquatic Botany. vol. 38, 4 (1990): 377-389.

Cannon. "On the Relation of Root Growth and Development to the Temperature and Aeration of the Soil." American Journal of Botany. vol. 2, 5 (1915): 211-224.

Chang. "Effect of Carbon Dioxide on Absorption of Water and Nutrients by Roots." Plant Physiol. vol. 20, 2 (1945): 221-232.

Cramer. "Inorganic carbon fixation and metabolism in maize roots as affected by nitrate and ammonium nutrition." Physiologia Plantarum. vol. 89, 3 (2006): 632-639.

Dilorio. "Carbon dioxide improves the growth of hairy roots cultured on solid medium and in nutrient mists." Applied Microbiology Biotechnology. vol. 37 (1992): 463-467.

Gorski. "1986: Response of eggplant solanum melogena to a root environment enriched with carbon dioxide." Hortsciencesect. vol. 1 (1986): 495-498.

Grinfield. "On the Nutrition of Plants with Carbon Dioxide through the Roots." Physiology of Plants. vol. 97, 5 (1954).

Jin. "Elevated Carbon Dioxide Improves Plant Iron Nutrition through Enhancing the Iron-Deficiency-Induced Responses under Iron-Limited Conditions in Tomato." Plant Physiology. vol. 150 (2009): 272-280.

Written Opinon and International Search Report issued in corresponding PCT/US18/65373, dated Feb. 27, 2018, pp. 1-41.

Prior art search conducted Jan. 4, 2018, PatPro Inc., Taun Nguyen, pp. 1-7.

Subbaiah, S.V., et al. "Studies on yield maximization through balanced nutrient ratios in irrigated lowland rice." International Rice Commission Newsletter (FAO), 50 (2001): 59-65.

(56) References Cited

OTHER PUBLICATIONS

Demand for Chapter II and Response to Written Opinion filed in corresponding PCT/US18/65373, filed May 15, 2019, pp. 1-34.
International Preliminary Report on Patentability issued in PCT/US18/065373, dated Aug. 27, 2019, pp. 1-13.
Zahid, "A comprehensive review on biodegradable polymers and their blends used in controlled release fertilizer processes," Rev., Chem. Eng. 2015; 31(1) pp. 69-95.
Kissel, "Management of urea fertilizers," Kansas State University, 1988.
Cai, et al. "Nitrogen loss from ammonium bicarbonate and urea fertilizers applied to flooded rice," Fertilizer Research 10.3 (1986): 203-215.
Black, et al. "Effects of form of nitrogen, season, and urea application rate on ammonia volatilisation from pastures," New Zealand Journal of Agricultural Research 28.4 (1985): 469-474.
Yong Zhang, "An Eco-Friendly Slow-Release Urea Fertilizer Based on Waste Mulberry Branches for Potential Agriculture and Horticulture Applications," Sustainable Chem. Eng. 2014, 2, 7, 1871-1878.
Yangfang. "k-CarrageenanSodium Alginate Beads and Superabsorbent Coated Nitrogen Fertilizer with Slow-Release, Water-Retention, and Anticompaction Properties," Ind. Eng. Chem. Res., 2012, 51 (3), pp. 1413-1422.
Chen Lung-Yie, et al. "Effect of deep-application of prilled ammonium bicarbonate fertilizer on the nitrogen supplying status of non-calcareous paddy soils." Acta Pedologica Sinica, 15, 75-82 (1978).
Li, et al. "Ammonium bicarbonate used as a nitrogen fertilizer in China." Fertilizer Research (1980) 1: 125.
Savant et al. "Deep placement of urea supergranules in transplanted rice: Principles and practices." Fertilizer Research (1990) 25: 1.
Song, et al. "Study on fertilizer efficiency and its mechanism of urea and ammonium bicarbonate treated with controlled-release technology." Journal fo Plant Nutrition and Fertilizer, 2003, 9(1): 50-56.
Higuchi, et al. "Further evidence for gaseous $CO_2$ transport in relation to root uptake of $CO_2$ in rice plant, Soil Sciene, and Plant Nutrition." 1984, 30:2, 125-136.
Enoch, et al. "Plant response to irrigation with water enriched with carbon dioxide." New Phytologist, 1993, 125: 249-258.
Stolwijk, et al. On the Uptake of Carbon Dioxide and Bicarbonate by Roots, and Its Influence on Growth. Plant Physiol. 1957;32(6):513-20.
Harris-Lovett. (Jul. 22, 2015) GMO rice could reduce greenhouse gas emissions, study says. Retrieved from http://www.latimes.com.
Ikeda, et al. (1992) Stimulation of dark carbon fixation in rice and tomato roots by application of ammonium nitrogen, Soil Science and Plant Nutrition, 38:2, 315-322.
Bergquist, (1964) Absorption of Carbon Dioxide by Plant Roots, Botaniska Notiser, 117:3, 249-261.
Allen, et al. (2005) Crop Responses to Elevated Carbon Dioxide and Interaction with Temperature, Journal of Crop Improvement, 13:1-2, 113-155.
Colmer, et al. (2006), Root aeration in rice (Oryza sativa): evaluation of oxygen, carbon dioxide, and ethylene as possible regulators of root acclimatizations. New Phytologist, 170: 767-778.
Wikipedia. "Soil Test." Version: Jun. 25, 2017. (Jun. 25, 2017) Retrieved: Feb. 8, 2019 (Feb. 8, 2019). wikipedia.org.
Livingston. "The Soil as Direct Source of Carbon Dioxide for Ordinary Plants" Plant physiology vol. 9,2 (1934): 237-59.
Leonard. "Effect of Various Oxygen and Carbon Dioxide Concentrations on Cotton Root Development" Plant Physiology Jan. 1946, 21 (1) 18-36.
Madhu. "Dynamics of Plant Root Growth Under Increased Atmospheric Carbon Dioxide" Agron. J. (2013) 105:657-669.
Lowe. "Carbon Dioxide Requirement for Growth of Legume Nodule Bacteria" Soil Science vol. 94, 6 (1962): 351-356.
Ma. "An inorganic $CO_2$ diffusion and dissolution process explains negative $CO_2$ fluxes in saline/alkaline soils" Sci. Rep. 3, 2025 (2013): 1-7.

Majeau. "Effect of $CO_2$ Concentration on Carbonic Anhydrase and Ribulose-1,5-Biphosphate Carboxylase/Oxygenase Expression in Pea" Plant Physiol. vol. 112 (1996): 569-574.
Matocha. "Effects of carbon dioxide and iron enrichment of a calcareous soil on Fe-chlorosis, root and shoot development of grain sorghum." Journal of Plant Nutrition. vol. 11, 6-11 (1988): 1503-1515.
Mauney. "Responses of Glasshouse Grown Cotton to Irrigation with Carbon Dioxide-Saturated Water." Crop Sci. vol. 28, 5(1088): 835-838.
Miller. "Carbon Dioxide-Bicarbonate Absorption, Accumulation, Effects on Various Plant Metabolic Reactions, and Possible Relations to Lime-Induced Chlorosis." Soil Sci. vol. 89, 5 (1960): 241-245.
Mingo-Castel. "Effect of Carbon Dioxide and Ethylene on Tuberization of Isolated Potato Stolons Cultured in Vitro." vol. 53 (1974) 798-801.
Shingo. The intake and utilization of carbon by plant roots from C14 labeled urea Part I. The determination of radioactive carbon of plant materials and a preliminary seedling experiment utilizing C14-labeled urea. Soil Sci. and Plant Nutrition vol. 3,1 (1957): 59-64.
Moore. "Potential for Irrigation with Carbon Dioxide." Acta Hortic. (1990). www.actahort.org.
Niu. "Effect of elevated $CO_2$ on phosphorus nutrition of phosphate-deficient Arabidopsis thaliana (L.) Heynh under different nitrogen forms." Journal of Experimental Botany, vol. 64,1 (2013): 355-367.
Nobel. "Soil O2 and $CO_2$ Effects on Root Respiration of Cacti." Plant and Soil. 120,2 (1989). 263-271.
Novero. "Field-grown tomato response to carbonated water application." Agronomy journal, vol. 83, 5 (1991): 911-916.
Noyes. "Root Variations Induced by Carbon Dioxide Gas Additions to Soil." Botanical Gazette. vol. 66,4 (1918): 364-373.
Noyes. "Residual Effects of Carbon Dioxide Gas Additions to Soil on Roots of Lactuca sativa." Botanical Gazette. vol. 69,4 (1920): 332-336.
Noyes. "Effects of Saturating Dioxide." Science, vol. 40, 1039 (1914): 792.
Paliwal. "Effect of bicarbonate-rich irrigation waters on the growth, nutrient uptake and synthesis of proteins and carbohydrates in wheat." Plant Soil vol. 43, 1-3 (1975): 523-536.
Palmer. "Cytokinins and Tuber Initiation in the Potato Solanum tuberosum L." Nature. vol. 221 (1969): 279-280.
Mitsui. "On the utilization of carbon in fertilizers through rice roots under pot experimental condition." Soil Science and Plant Nutrition. vol. 8,6 (1962): 16-23.
Radford. "New Research Shows Tree Roots Regulate $CO_2$, Keep Climate Stable." Version: Feb. 19, 2014. (Feb. 19, 2014) Retrieved: Jan. 25, 2016 (Jan. 25, 2016). ecowatch.com.
Ryan. "Effect of Surface-Applied Sulfuric Acid on Growth and Nutrient Availability of Five Range Grasses in Calcareous Soils." Journal of Range Management. vol. 28, 5 (1975): 411-414.
Skelding. "The Effect of Carbon Dioxide on the Absorption of Manganese by Root Tissues of Red Beet." Ann Bot. vol. 21, 1 (1957): 121-141.
Skok. "Upate of $CO_2$ by roots of Xanthium plants." Bot. Gaz. 124 (1962): 118-120.
Stoter. "Radioactive Anomalies from Old $CO_2$ in the Soil and Canopy Air." Radiocarbon. vol. 53, 1 (2011): 55-69.
Spittstoesser. "Dark $CO_2$ Fixation and its Role in the Growth of Plant Tissue." Plant Physiol. 41, 5 (1966) 755-759.
Stemmet. "The Uptake of Carbon Dioxide by Plant Roots." Plant and Soil. vol. 17, 3 (1962): 357-364.
Storlie. "Soil, plant, and canopy responses to carbonated irrigation water." Hort. Technology, vol. 6, 2 (1996): 111-114.
Sun. "Effects of elevated $CO_2$ Applied to Potato Roots on the Anatomy and Ultrastructure of Leaves." Biologia Plantarum vol. 55, 4 (2011): 675-680.
Unger. "Influence of Oxygen and Carbon Dioxide on Germination and Seedling Development of Corn (Zea mays L.)." Agronomy Journal. vol. 57,1 (1965): 56-58.
Britannica, The Editors of Encyclopaedia. "sodium". Encyclopedia Britannica, Jan. 7, 2019, <https://www.britannica.com/science/ sodium>. (Year: 2019).

(56) References Cited

OTHER PUBLICATIONS

Office Action issued in U.S. Appl. No. 17/227,596, dated Jul. 8, 2021, pp. 1-33.
Invitation issued in PCT/US/26983, dated Jul. 6, 2021, pp. 1-2.
Qiu, "Biostimulant Seed Coating Treatments to Improve Cover Crop Germination and Seedling Growth," Agronomy 2020, 10, 154; doi:10.3390/agronomy10020154, www.mdpi.com/journal/agronomy Received: Dec. 28, 2019; Accepted: Jan. 19, 2020; Published: Jan. 22, 2020, pp. 1-14.

* cited by examiner

Roots of C Formulation        Roots of Baseline

PLANT GROWTH ENHANCER USING CARBON DIOXIDE TO INCREASE PLANT YIELD AND METHOD OF INCREASING PLANT YIELD

FIELD OF THE INVENTION

The invention relates to a plant growth enhancer comprising a source of carbohydrate, a source of carbon dioxide, and a source of acid; and a method of growing plants using the plant growth enhancer.

BACKGROUND OF THE INVENTION

Due to rising populations around the world and limited arable land for growing food, finding ways to improve food production is a serious concern. It is well known that plants need nitrogen, phosphorus, potassium, micronutrients, water and carbon dioxide to grow. Of the three major nutrients: nitrogen, phosphorus, and potassium; nitrogen is needed at the highest level to promote optimal growth. For example according to Subbaiah, et al, a $N:P_2O_5:K_2O$ ratio of 4:2:1 is recommended for growing rice {Subbaiah, S. V., et al. "Studies on yield maximization through balanced nutrient ratios in irrigated lowland rice." International Rice Commission Newsletter (FAO), 50 (2001): 59-65}. However, the carbon required by plants such as a rice plant and its grain is much higher than its need for nitrogen, phosphorus, or potassium. The required nitrogen is typically higher than for phosphorus, potassium and other nutrients. Measurements of 46 w/w % or more carbon and only 1.3 w/w % nitrogen are common for rough rice (the whole rice grain with the hull). These carbon and nitrogen values result in a carbon:nitrogen (C:N) ratio for rough rice of 35:1. This high C:N ratio illustrates that the amount of carbon needed to promote plant growth and yield dramatically outweighs all of the other nutrients.

It is typically accepted that plants obtain carbon dioxide from the surrounding air through the stomata in their leaves. However, the amount of carbon dioxide in air is extremely low (currently about 355 ppm). Carbon is a limiting nutrient in plant growth, and thus finding other ways to supply carbon dioxide to plants have been investigated for years. It is well known that supplying gaseous $CO_2$ to plant leaves increases yield and is a common practice for greenhouse horticulture.

When a plant seed first sprouts, the only nutrients and energy available for growth are stored in the seed. Initially, the roots form and then the leaves. The leaves of the small seedling have very little surface area, and photosynthesis is limited to the amount of energy the leaves can accept as well as carbon available to build new plant cells. If a plant is stimulated to produce early roots, it gives the plant a head start that allows it to more efficiently take up nutrients including carbon that can be at the roots. The present invention supplies plant roots with additional uptake-available carbon and energy-rich carbohydrates to promote rapid growth that helps to overcome the low surface area of early leaves and therefore further increases plant growth. This early root and plant growth benefit carries on through the whole life cycle of the plant and results in increased crop yields as our examples will show.

It is known to grow algae and cyanobacteria, commonly referred to as blue-green algae, in a water regime, wherein the algae is supplied carbon dioxide either as gaseous $CO_2$ or as bicarbonate to dramatically increase growth. Algae is also grown in the dark using sugar or starch as its energy and carbon source. Now, with a present invention a new plant growth enhancer has been developed to supply energy and nutrients including carbon dioxide, to the roots of plants. Special attention has been paid to developing this plant growth enhancer for plants grown in a water saturated regime and to date this has been most effective. The present inventive plant growth enhancer is greatly effective in growing hydrophilic plants including rice, wild rice (genus: *Zizania*), sugar cane, water chestnuts, lotus, taro, water spinach, watercress, water celery, arrowroot, sago palm, nipa palm, marsh type or fen grasses such as *Saccharum* hybrids, and other biomass crops such as bald cypress and *eucalyptus*. The inventive plant growth enhancer is effective in growing all types of plants. The plants can be grown in soil or hydroponically. Other preferred agricultural crops, include corn, wheat, soybeans, and cotton.

Without being bound by any theory, the inventors believe the inventive fertilizer enhances early root growth of plants and early plant growth as will be shown by our examples.

In the past, studies into supplying carbon dioxide to the roots of plants have led to mixed results. Some of these studies have shown increased root growth and improved nutrient uptake. U.S. Pat. No. 5,044,117 (US '117) discloses a method of fertilization that supplies gaseous carbon dioxide and oxygen to the roots of plants grown hydroponically to improve growth. The present invention provides carbon dioxide to plant roots in a water regime but in contrast with US '117, the present novel invention does not provide oxygen and contains energy rich organic compounds as well as acid.

Figure 1:
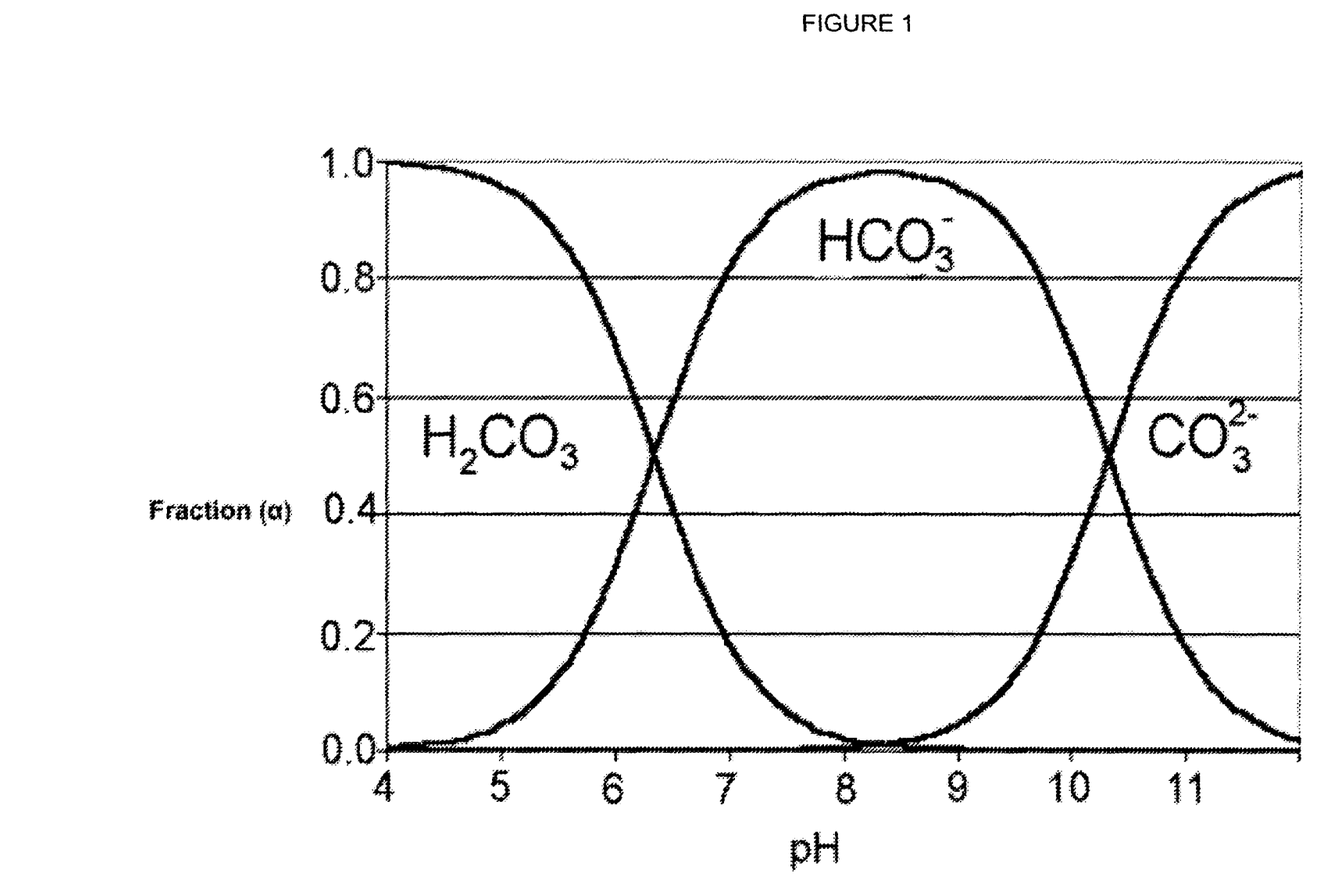
FIG. 1—shows a graph of the fraction of various forms of carbon dioxide found in solution at atmospheric pressure as a function of pH, graph from Utah State University, www.usu.edu.

Shown in present FIG. 1 is a graph of the relationship between the form of dissolved carbon dioxide and solution pH. This graph shows that when the pH of the solution is below about 6.3, the majority of the carbon dioxide in solution is as carbonic acid.

Chinese patents CN1240777A, CN1400196, and CN1408680A recognize the plant yield benefits of supplying gaseous carbon dioxide produced from a solid fertilizer placed in the soil. The ingredients in these solid fertilizers are designed to react with each other to release carbon dioxide gas to plant leaves for plants grown in a covered or protected environment such as in a greenhouse rather than supplying the carbon to the plant roots as carbon dioxide and carbohydrates as in the present invention. CN1240777A combines ammonium bicarbonate with a solid acid made by reacting sulfuric acid, nitric acid, lignite, and powdered phosphorus ore; CN1400196 uses calcium carbonate (limestone) as the carbon dioxide source and combines it with sulfur and ammonium phosphate; and CN1408680A uses ammonium bicarbonate as the carbon dioxide source and combines it with bisulfates or bisulfites. By producing the carbon dioxide in gaseous form from the reaction of the fertilizer ingredients, the carbon in the fertilizers of these Chinese patents is inefficient unless it is used in a contained environment like a greenhouse. The present invention holds the carbon in soil solution as a carbonic acid or as dissolved carbon dioxide at the plant roots and therefore can be used to make carbon available to plants in open fields. In addition, the present invention includes carbon and energy from other sources such as starches, seed grinds, and sugars. This additional carbon source is not employed in any of these Chinese patents. Finally, the plant growth enhancer of the present invention provides a measurable synergism among the components of the plant growth enhancer to increase crop yield, improve efficiency of nitrogen uptake by the plant, improve nitrogen (protein) levels in plant products, and increase plant uptake of carbon dioxide more than an additive effect.

Lowering fertilizer nitrogen losses when used in growing crops as a result lowers $NO_x$ emissions from growing those crops with nitrogen fertilizer and thereby the contribution to greenhouse gases is also decreased. The inventive plant growth enhancer can surprisingly reduce nitrogen losses, thereby reducing undesirable greenhouse gases.

SUMMARY OF THE INVENTION

An objective of the invention is to provide a novel plant growth enhancer for increasing plant root growth and plant yield.

The invention includes a plant growth enhancer used to produce increased yields in crops, produce increased plant root growth, improve efficiency of nitrogen uptake by the plant, improve nitrogen levels in plant products, and increase plant uptake of carbon in crops. The present invention provides energy and carbon and other nutrients in the form of a plant available source of carbohydrate such as for instance seed grind, starch, and/or sugar to the plant roots early in the plant growth; supplies carbon dioxide to the roots of plants by applying carbon dioxide in the form of a solid, gas, liquid, suspension, or slurry; and takes advantage of the invention's ability to make available other carbon sources to the plant.

The inventive plant growth enhancer comprises a source of carbon dioxide such as dry ice, carbon dioxide gas, liquid carbon dioxide, solutions of carbon dioxide, suspensions with carbon dioxide, and slurries with carbon dioxide; a source of carbohydrate chosen from the group of carbohydrates such as at least one of a seed grind, starch, or sugar; and a source of acid chosen as at least one of phosphoric acid, sulfuric acid, nitric acid, hydrochloric acid, or organic acids. This combination of ingredients including carbon dioxide, source of carbohydrate, and acid provides a measurable unexpected synergism demonstrated as unexpected increase in crop yield, improved efficiency of nitrogen uptake by the plant, improved nitrogen levels in plant products, and increased plant uptake of carbon dioxide.

The source of carbohydrate of the invention provides more than just carbohydrate by using seed grind. Seed grind is the powdery ground grain (seed) of a plant and within this grain is everything that a young plant needs for early growth including carbohydrates and nitrogen, as well as other plant nutrients, secondary nutrients, and micronutrients. The seed grind used in the invention may also include the ground coating of the grain or hull of the grain that also contains nutrients beneficial for plant growth. Preferably, the seed grind is formed from the same type of plant to be grown. For example, for rice, a preferred seed grind is rough rice seed grind. Seed grind can include other ingredients such as one or more of the group comprising additional plant parts, dirt and/or other contaminants, molds, fungi, dispersing agents, parting agents, binders, bacteria, herbicides, pesticides, fungicides, and/or stabilizers, and/or other contaminants or additives. The seed grind does not require the use of seed that has been cleaned to levels for human consumption.

Without being bound by any theory, the inventors believe that using a seed grind formed from ground up seeds increases the available seed ingredients used to grow the initial roots from a seed, which greatly enhances the initial root growth. The early growth of roots is far more beneficial then enhancement of plant growth later in the growing cycle. For example, plants having enhanced early root growth stay ahead of other plants not having enhanced early root growth throughout the entire growing season. Preferably, the seed grind is formed from the same type of seed to be grown. For example, for growing rice, ground up rice seeds (seed grind) is preferably used to enhance the early growth of roots from the seed. However, other types of seed grind (non-rice seeds) can be used as an enhancer for rice. For example, rice seed grind has been found to be effective at enhancing the early growth of roots from cotton seeds. The seed can be coated with the seed grind.

A source of carbohydrate of the invention can be any seed grind. However, seed grind contains more than just a carbohydrate. As discussed previously, seed grind provides other seed ingredients required to grow the initial roots. Thus, an embodiment of the invention is the use of seed grind to grow initial roots from the seed.

Seed grind contains many benefits for plants. For example, Table 1 shows a comparison of energy and nutrients of various seeds, according to USDA Nutrient Database (https://fdc.nal.usda.gov/).

TABLE 1

Energy and Nutrients in Selected Seeds and Starch
Nutritional Value per 100 g

|  | Brown Rice | White Rice | Whole Wheat | Corn Meal (Corn Seed Grind) | Corn Starch |
|---|---|---|---|---|---|
| Energy | 370 kcal | 370 kcal | 332 kcal | 361 kcal | 375 kcal |
| Carbohydrates | 77.24 g | 81.68 g | 74.48 g | 76.85 g | 87.5 |
| Sugars | 0.85 g | Not reported | 1.02 g | 0.64 g | 0 |
| Dietary Fiber | 3.52 g | 2.8 | 13.1 g | 7.3 g | 0 |
| Fat | 2.92 g | 0.55 g | 1.95 g | 3.86 g | 0 |
| Protein | 7.82 g | 6.81 g | 9.61 g | 6.93 g | 0 |
| Calcium | 23 mg | 11 mg | 33 mg | 7 mg | 0 |
| Iron | 1.47 mg | 1.6 mg | 3.71 g | 2.38 mg | 0 |
| Magnesium | 143 mg | 23 mg | 117 g | 93 mg | 0 |
| Phosphorus | 333 mg | 71 mg | 323 mg | 272 mg | 0 |
| Potassium | 223 mg | 77 mg | 394 mg | 315 mg | 0 |

TABLE 1-continued

Energy and Nutrients in Selected Seeds and Starch
Nutritional Value per 100 g

|  | Brown Rice | White Rice | Whole Wheat | Corn Meal (Corn Seed Grind) | Corn Starch |
|---|---|---|---|---|---|
| Selenium | 23.4 μg | 15.1 μg | 12.7 μg | 15.4 μg | 0 |
| Sodium | 7 mg | 7 mg | 3 mg | 5 mg | 0 |
| Zinc | 2.02 mg | 1.2 mg | 2.96 mg | 1.73 mg | 0 |

Brown rice also contains many vitamins. As can be seen from Table 1, brown rice contains energy including carbohydrates and sugars as well as nutrients that are beneficial to plant growth. Brown rice seed grind contains more than white rice seed grind. Similarly, corn meal (corn seed grind) contains nutrients not found in corn starch.

Thus, seed grind including the whole seed provides more benefit to the growth of plants than seed grind that includes only seed without the hull, coating, and/or bran. Thus, a preferred seed grind of the invention includes seed grind comprising one or more selected from the group of rough rice seed grind, brown rice seed grind, whole wheat seed grind, wheat seed grind that includes the hull, corn seed grind, and/or other whole grains and/or whole grains with hulls.

A particle size range of a seed grind can be preferably 95% of the particles by weight between 44 micrometers (325 ISO sieve designation) and 2.00 mm (10 ISO sieve designation) or preferably 90% of the particle by weight between 63 micrometers (230 ISO sieve designation) and 2.00 mm (10 ISO sieve designation). We believe that seed grinds having a higher percentage of larger particle sizes will have a slower release of benefits to a plant over time and that seed grinds having a higher percentage of lower particles sizes will have a faster release of benefits to a plant over time. Thus, the size of the seed grind can be adjusted for the particular application as desired.

Based on the chemical formula for corn starch, the percent carbon present in corn starch is 46.8%. According to Xue, the carbon in rice grain is 53-64% (Xue, W-ei, "Evaluation of biophysical factors driving temporal variations in carbon gain, water use and yield production in rice," Thesis, Lanzhou University, January 2015).

The invention can be in solid, semi-solid, or liquid form as desired for the particular application and/or plant growth environment.

The present invention is free of components unsuitable for use as a plant growth enhancer. Hence, the invention is free of components harmful to humans or animals such as lithium and heavy metals. For this invention free means that the levels meet the limits set by government for land application and that the levels are below accepted levels that are shown to cause harm to humans or animals consuming the plant or crop.

If soil tests show the soil to be deficient in one or more nutrients, then a starter fertilizer that contains a small amount of nitrogen with other primary nutrients, secondary nutrients, and micronutrients at the levels indicated by soil tests can be applied. This starter fertilizer can be applied at, before, or just after planting and prior to the application of the present invention.

The invention is preferably applied as a solid, a liquid, a suspension, a slurry, or gas to the soil surface or beneath the soil surface. The invention ideally works for crops such as rice, wild rice (genus: Zizania), sugar cane, water chestnuts, lotus, taro, water spinach, watercress, water celery, arrowroot, sago palm, nipa palm, marsh-type or fen grasses such as Saccharum hybrids, and other biomass crops such as bald cypress and eucalyptus grown under flooded or high moisture conditions. The invention is also effective for growing all types of plants including but not limited to corn, cotton, wheat, soybeans, cassava, sugar beets, energy grasses such as Miscanthus, Pennisetum purpureum, Switchgrass, and other prairie grasses or crops.

The inventive plant growth enhancer can produce increased plant growth for all types of plants including but not limited to trees, bushes, ornamental plants, vegetables, fruits, vines, and more regardless of whether the plants are grown from seeds, rhizomes, tubers, roots, grafts, or any other method of starting plants. The inventive plant growth enhancer can be especially beneficial to seedlings that are transplanted. For example, the invention can shorten the time for transplanted seedlings to reach maturity after transplanting.

The present invention includes methods of applying the inventive plant growth enhancer, including multiple applications, i.e., an application of the inventive plant growth enhancer very early such as at planting the seed followed by later additional applications still very early in the plant growth when the plant most benefits from additional carbon dioxide and energy at the roots.

Thus, the invention includes methods of multiple applications of the inventive plant growth enhancer wherein a first application plant growth enhancer can be applied when a seed is planted and at least one more application of plant growth enhancer can be applied between 2 weeks and 8 weeks after the seed is planted. For all of these multiple applications, the invention can be applied when the seed is planted and again when the seedling is transplanted.

An alternative embodiment of the invention is comprised of a source of carbon dioxide and a source of acid.

Another alternative embodiment of the invention is comprised of a source of carbon dioxide and a source of carbohydrate.

DETAILED DESCRIPTION OF THE INVENTION

It is well documented by agronomists that when a plant has a head start, it is always a healthier and more productive plant. A set of tests discussed in Example 1 were performed using a unique approach to observe early root growth without damaging the plants. This was accomplished by planting seeds in cups of soil where the cup was transparent. This transparent cup was then placed inside an opaque cup. The seeds were planted in the soil against the inside surface of the transparent cup so that the roots could be checked simply by pulling the transparent cup out of the opaque cup and then replacing it when finished with the observation. The opaque cup protected the roots from light during growth. The roots were viewed and pictures taken without disturbing the plants as they were developing and therefore a view of the early growth of the roots was possible. Seeing the early roots revealed how quickly they developed and allowed them to be compared with baseline roots and thereby showed the extreme benefits of the early application of the invention even before significant plant leaves were formed. These observations and the crop yields obtained later for the plants that were transplanted from the cups demonstrated that early improved root development for the invention resulted in increased plant growth and increased crop yield. Even early in the plant growth, the improvements in the roots of the plants receiving the inventive plant growth enhancer were dramatically evident to the observer. This was because the plant's need for carbon dioxide and energy was supplied before the leaves of the plants could provide them. See FIG. 2 for a picture of the early root growth for one of the plants receiving the inventive plant growth enhancer compared to a baseline plant.

For this description, improved nitrogen efficiency means that nitrogen loss to the atmosphere is reduced by increasing the plant's ability to take up nitrogen early. Improved carbon uptake efficiency means that plants are able to utilize available carbon sources in the invention, soil, and atmosphere more than plants grown under similar conditions with fertilizers supplying the same levels of primary nutrients (nitrogen, phosphorus, and potassium), secondary nutrients (sulfur, calcium, and magnesium), and the same level of micronutrients such as for example zinc, boron, iron, copper, manganese, molybdenum, or selenium. The plant utilization of carbon is measured as increased root mass, increased foliage mass, and when present, increased crop yield of plant product, such as for example grain.

For this description, crop yield refers to the weight of plant product per unit growing area, wherein the plant product is the part of the plant that is valuable as a commercial product, such as grain for example. Crop yield is typically expressed as kg/hectare, tonnes/hectare, bushels/acre, or pounds/acre depending on the type of crop grown.

For this description, the amount of protein in the crop plant product refers to the weight percent of protein found in the crop plant product, such as grain for example. The protein level is quantified by measuring the weight % of nitrogen in the crop plant product.

For this description, early in the plant growth means before the plant foliage weight reaches 5% of the plant foliage weight at harvest and preferably before the plant foliage weight reaches 2% of the plant foliage weight at harvest and most preferably some placed at planting.

The invention is used to produce increased yield in crops, improve efficiency of nitrogen uptake by the plant, improve nitrogen levels in plant products, and increase plant uptake of carbon in crops. The present invention provides carbon dioxide and energy rich carbohydrates and takes advantage of the invention's ability to make available other nutrient sources to the plant.

At planting and prior to or with the application of the present invention, a starter fertilizer can be applied to the soil days before, at, or shortly after planting. This starter fertilizer is chosen based on the needs for the plants being grown and the levels of nutrients available in the soil. These nutrient levels applied are adjusted to meet plant needs at seeding and at subsequent applications. The starter fertilizer contains preferably starter nitrogen in the form of a nitrogen fertilizer such as urea, ammonium nitrate, ammonium sulfate, potassium nitrate, mono ammonium phosphate (MAP), diammonium phosphate (DAP), urea-ammonium nitrate (UAN), ammonium bicarbonate, and sodium nitrate. In addition, the starter fertilizer can include other nutrients or micronutrients recommended based on the crop being grown and the soil test results on the soil used to grow the crop. Other nutrients in the starter fertilizer recommended based on soil testing can include phosphorus from fertilizers such as MAP, DAP, triple super phosphate and super phosphate; potassium from fertilizers such as potassium chloride and potassium sulfate; sulfur from elemental sulfur and a variety of sulfate fertilizers; and micronutrients such as magnesium, calcium, zinc, boron, manganese, iron, and more.

One embodiment of the invention is a liquid, suspension, or slurry plant growth enhancer comprised of a source of carbon dioxide selected from one or more of liquid carbon dioxide, dissolved carbon dioxide, a suspension containing carbon dioxide, and slurries containing carbon dioxide; and a source of carbohydrate chosen from the group of carbohydrates such as at least one of a seed grind, starch, or sugar; and an acid component selected from one or more of phosphoric acid, sulfuric acid, hydrochloric acid, nitric acid, or organic acids.

In a preferred embodiment, the inventive plant growth enhancer is comprised of a ratio of weight of carbon dioxide to weight of source of carbohydrate of between 10:1 and 0.5:1. The source of acid is preferably in an amount needed to acidify the soil surrounding the roots of the plant to a pH range of between 4.5 and 6. The amount of source of acid in the plant growth enhancer required to provide a pH of between 4.5 and 6 can be determined by forming an aqueous solution of the source of carbon dioxide and the source of carbohydrate and then measuring while adding the source of acid to the aqueous solution until the pH is a desired amount between 4.5 and 6, which amount of source of acid to provide the desired pH can be utilized in the plant growth enhancer formulation. The source of acid can be in solid, semi-solid, or liquid form.

Using an acid in the invention produces an unexpected increase in crop yield as compared to crop yield produced when the invention is applied without the acid. The inventors believe that this increase in yield is due to increased levels of dissolved carbon dioxide held in the soil solution as a result of the acid addition. This acid is also added preferably based on the soil conditions in which the plant is grown.

Another embodiment of the invention is a solid plant growth enhancer comprised of a source of carbon dioxide made up of dry ice; a source of carbohydrate chosen from the group of carbohydrates such as at least one of a seed grind, starch, or sugar; and a source of acid selected from one or more of phosphoric acid, sulfuric acid, hydrochloric acid, nitric acid, or organic acids.

A preferred embodiment of the invention is dry ice that contains within it brown rice seed grind or is mixed with brown rice seed grind. The dry ice also contains acid. This solid invention can be either as powder, flakes, or pellets.

Rice seed grind, in particular brown rice seed grind, and more particularly rough rice seed grind is a preferred source of carbohydrate because it is comprised of more than just starch. It also is comprised of nitrogen and other nutrients, secondary nutrients, and micronutrients that help to promote plant growth and crop yield.

The source of carbohydrate of the invention can be provided by any seed grind. A seed grind is the powdery ground grain (seed) of a plant. The seed grind may include the bran of the grain as is the case for brown rice seed grind.

The seed grind used in the invention may also include the ground hull of the grain that also contains nutrients beneficial for plant growth. Preferably, the seed grind is formed from the same type of plant to be grown. For example, for rice, a preferred seed grind is rough rice seed grind.

Prior to applying the invention, water may be added. A preferable amount of water used is such that the final mixture is 80 to 99.99% water, more preferably 90 to 99.9% water, and more preferably 95 to 99.8% water. Irrigation water can be used.

The invention can be applied to the soil with or without added water either by applying to the surface of the soil and then watering into the soil or applying beneath the soil surface.

Unless otherwise stated in this description, all percent amounts are weight percent based on the total weight of the composition. For the components of the invention, all of the % compositions are calculated as weight percent of the total composition on a dry basis; or in other words, they are calculated as a percent of the total weight without added water. Thus, for suspensions, slurries and dispersions, the amount of the active ingredients can be determined before adding water and non-active ingredients such as for example fillers.

A source of carbohydrate of the plant growth enhancer can be one or more selected from the group of carbohydrates such as starches such as corn starch or rice starch; sugars such as sucrose; seed grinds such as rice seed grind, wheat seed grind, or corn seed grind; or a combination of the carbohydrate sources.

The plant growth enhancer can be placed beneath the soil 1.3-25.4 cm (0.5-10 inches) deep and more preferably 5.1-12.7 cm (2-5 inches) deep early in the plant's growth. Alternatively, the plant growth enhancer can be applied to the surface of the soil and mechanically incorporated into the soil or moved into the soil with water. Ideally, the depth is chosen to make the plant growth enhancer available in the root zone of the plant early in the plant growth preferably at planting the seed, within a week of planting the seed. When planting a seedling, the plant growth enhancer can be placed at the time of planting. Additional applications of the plant growth enhancer can be applied as desired. For example, additional applications of the plant growth enhancer can be applied preferably up to 35 days after the first application.

In one preferred method of the invention, plant growth enhancer is applied to paddy rice seedlings at a carbon dioxide level of 10 $g/m^2$ to 100 $g/m^2$ with or after planting the seed and prior to transplanting the plants. For this method, the plant growth enhancer is applied to rice in the field at a carbon dioxide level of 5 kg/hectare to 50 kg/hectare either just before, at, or after the paddy rice is transplanted. A single application of plant growth enhancer may also be used.

In another preferred method of the invention, the plant growth enhancer is applied to rice that is planted directly in the field as seed at a carbon dioxide level of 5 kg/hectare to 50 kg/hectare at or up to one week after planting. The plant growth enhancer is applied again to rice in the field at a level of 5 kg/hectare to 50 kg/hectare from 1 week after planting up to the five leaf stage of the rice plant. A single application of plant growth enhancer may also be used.

When used to grow rice, the invention provides an unexpected increase in crop yield of up to 60% or more, an increase in carbon uptake of up to 60% or more, an increase in nitrogen uptake of up to 60% or more, and an increase in protein levels in the rough rice of up to 10% or more.

Elevated carbon dioxide levels in the atmosphere is of concern for human health, our climate, and the balance of ecosystems. According to a study at the Harvard School of Public Health (Myers, S. S., et al. "Rising $CO_2$ threatens human nutrition." *Nature* 510 (Jun. 5, 2014): 139-142), rice plants grown with elevated atmospheric carbon dioxide produced rice with lower protein levels. However, the present invention shows an unexpected benefit that with increased carbon uptake by the rice plant there is a corresponding increase of up to 10% or more in the protein levels in the rice.

An effective method of the invention includes the following:

Performing soil tests to identify primary nutrient, secondary nutrient, and micronutrient deficiencies; 2) Applying starter nutrients to the soil early in the crop growth at the levels recommended for the crop being grown and based on the expected crop yield per acre and the soil test results; 3) Applying the inventive plant growth enhancer to the soil early in the crop growth before, at, with, or after applying the starter nutrients by burying the invention, side applying the invention, mechanically incorporating the invention, broadcasting the invention, injecting the invention, spraying the invention, or any combination of these at the levels recommended for the crop being grown and based on the expected crop yield per acre and the soil test results.

Preferably, the enhancer is not a fertilizer and is substantially free of nitrogen fertilizers, such as ammonium-base fertilizers. The term fertilizer requires the use of a nitrogen source for plants.

Preferably, the plant growth enhancer includes a source of carbon dioxide, a source of acid and a source of carbohydrate, which provides the most improved growth rates. However, if desired the invention can be practiced using a source of carbon dioxide and a source of acid without a source of carbohydrate or alternatively a source of carbon dioxide and a source of carbohydrate without a source of acid, which both provide enhanced growth rates. For example, when the soil is already acidic within a desired pH range, no source of acid may be necessary.

EXAMPLES

The examples below support the following statements:

Gaseous $CO_2$ and/or $CO_2$ solution supplied to early plant roots without an organic-energy source produce an improvement in plant growth and crop yield of up to 20% over plants grown without the $CO_2$.

With the application of $CO_2$ with an organic-energy source, the crop yield improves up to 60% over plants grown without the invention.

Using a low level of acid in the invention is excellent in making the carbon dioxide more available to plants.

On average, applying carbon dioxide without any carbohydrate produced a 12% increase in crop yield over the baseline.

On average, applying the carbohydrate with carbon dioxide produced a 21% increase in crop yield over the baseline.

Example 1

Rice was planted in small 473 mL (16 ounce) cups using sieved topsoil from the local area. Each cup had 420 g of soil mixed with 0.125 g of super phosphate. Each cup was given 25 mL of a solution of starter fertilizer that contained 0.2 g urea, 0.2 g KCl, and 1.0 g Epsom salt. Two rice seeds were planted in each cup 1 inch deep and 3 inches apart. The holes were filled with sand and the cups were placed under a set of growth lights.

The cups holding the soil were transparent plastic and were placed inside opaque cups. The seeds were planted in the soil against the surface of the transparent cups and the outer opaque cups protected the roots from light during growth. By removing the inner cups, the roots were viewed and pictures taken without disturbing the plants as they were developing and therefore a view of the early growth of the roots was possible. Seeing the early roots allowed us to see how quickly they developed and allowed them to be compared with the baseline roots showing the extreme benefits of the early application of the invention even before significant plant leaves were formed. These observations and crop yields obtained later demonstrated that early improved root development for the invention resulted in increased plant growth and increased crop yield. Even early in the plant growth, the improvements in the roots of the plants receiving the inventive plant growth enhancer was dramatically evident to the observer. This was because the plant's need for carbon dioxide and energy was supplied before the leaves of the plants could provide them.

Solutions were made to apply to various containers with the following formulations:

Formulation A: Water Only (Baseline)

Formulation $B_p$: 1497 g of water with enough phosphoric acid to lower the pH to 5.7 and then saturated with carbon dioxide by adding dry ice ($PA+CO_2$)

Formulation $C_p$: 1497 g of water with enough phosphoric acid to lower the pH to 5.7, then mixing in 3.0 g of brown rice seed grind with a high shear mixer, and then saturating with carbon dioxide by adding dry ice ($PA+SG+CO_2$)

Formulation $D_p$: 1497 g of water with enough sulfuric acid to lower the pH to 5.7, then mixing in 3.0 g of brown rice seed grind with a high shear mixer, and then saturating with carbon dioxide by adding dry ice ($SA+SG+CO_2$)

Formulation $E_p$: Water saturated with carbon dioxide by adding dry ice ($CO_2$)

Formulation $F_p$: 1497 g of water, then mixing in 3.0 g of brown rice seed grind with a high shear mixer, and then saturating with carbon dioxide by adding dry ice ($SG+CO_2$)

Formulation $G_p$: 1497 g of water with enough phosphoric acid to lower the pH to 5.7, then mixing in 1.5 g of brown rice seed grind and 1.5 g of powdered sugar with a high shear mixer, and then saturating with carbon dioxide by adding dry ice ($PA+SG+PS+CO_2$)

Each time that the solution was added to the soil, dry ice was added to the solution formulations containing carbon dioxide to ensure that the solution was saturated.

On the day of planting (day 1), the containers were labeled with the formulation labels. Eighteen duplicate containers for each formulation were planted and each container was given 25 mL of the formulation for that container. An additional 25 mL of each formulation was given to the appropriate cups on day 3, day 6, day 8, and day 13. After day 13, the containers were no longer given formulations but instead watered to maintain normal soil moisture. When the plants were more than two inches tall, the plants were thinned to one plant per container and the containers were flooded until the water stood about 0.5 cm above the soil surface. As the plants grew, the water level was gradually raised to about 1 cm above the soil surface.

Twenty-eight days after planting the containers, the rice plants were transplanted into larger containers. These containers were prepared by placing 30 kg of sieved soil into the containers. 2.0 g of Triple super phosphate was mixed into the top 7.6 cm of soil. The containers were then watered to saturate the soil. Each container was given 200 mL of a starter fertilizer solution that contained 2.55 g urea, 2.2 g KCl, 0.7 g $ZnSO_4 \cdot H_2O$, 0.5 g boric acid, and 34.4 g Epsom salt.

Nine containers for each Formulation were prepared. These containers were labeled with the formulation letter and either a .PO or .PT. The .PO was for transplants that received application of formulations at Planting Only. The .PT was for transplants that received application of formulations at Planting and at Transplanting. The formulations given at transplanting for the .PT containers were made as listed below:

Formulation A: Water Only (baseline)

Formulation $B_T$: 499 g of water with enough phosphoric acid to lower the pH to 5.7 and then saturated with carbon dioxide by adding dry ice ($PA+CO_2$)

Formulation $C_T$: 499 g of water with enough phosphoric acid to lower the pH to 5.7, then mixing in 2.0 g of brown rice seed grind with a high shear mixer, and then saturating with carbon dioxide by adding dry ice ($PA+SG+CO_2$)

Formulation $D_T$: 499 g of water with enough sulfuric acid to lower the pH to 5.7, then mixing in 2.0 g of brown rice seed grind with a high shear mixer, and then saturating with carbon dioxide by adding dry ice ($SA+SG+CO_2$)

Formulation $E_T$: Water saturated with carbon dioxide by adding dry ice ($CO_2$)

Formulation $F_T$: 499 g of water, then mixing in 2.0 g of brown rice seed grind with a high shear mixer, and then saturating with carbon dioxide by adding dry ice ($SG+CO_2$)

Formulation $G_T$: 499 g of water with enough phosphoric acid to lower the pH to 5.7, then mixing in 0.5 g of brown rice seed grind and 0.5 g of powdered sugar with a high shear mixer, and then saturating with carbon dioxide by adding dry ice ($PA+SG+PS+CO_2$)

Three plants were transplanted into each container. The containers with .PT labels were given 100 mL of the transplant formulation on day 28 and the containers were flooded until water stood about 1 cm above the soil surface. These flood waters were gradually raised to 2 inches deep and maintained with rain water until harvest.

On day 141, the rice was harvested by cutting the panicles and the panicles were dried at 50° C. for 2 days. The Dry Panicle Weights per Container are shown in Table 1. Table 1 also includes the averages of the panicle weights per container for each formulation as well as an average weight per container for each formulation found without any outliers for that set. Outliers were determined as being outside±10% of the median weight for the set. These outliers are marked in Table 1 with an (O). The % Difference for the Adjusted Average Dry Panicle Weights per Container are shown in Table 2. These % Differences are as compared to the baseline for the test (Formulation A).

The data in Tables 1, 2, and 3 support the following statements:

Applying formulations containing only carbon dioxide alone to the rice plants produced up to a 20% increase in yield as compared to plants that did not receive carbon dioxide.

All applications of formulations containing carbon dioxide produced an increase in yield as compared to the baseline showing that carbon dioxide is a benefit.

Using phosphoric acid with carbon dioxide and brown rice seed grind provided up to a 31% increase in yield as compared to the baseline. The weight of phosphoric acid required to lower the pH of the solutions containing phosphoric acid to a pH of 5.7 was extremely low.

This weight was so low that the phosphorus supplied to the plant was insignificant compared to the phosphorus in the super phosphate put in the containers at planting (0.125 g) and the phosphorus in the triple super phosphate put into the containers at transplanting (2.0 g). Hence, the benefit from the phosphoric acid cannot be explained as additional phosphate available to the plant.

Providing carbohydrates with carbon dioxide to the plants as a combination of sugar and brown rice seed grind and acid produced an increase in yield of up to 29%.

For all but one test, the dual applications (.PT) produced a greater increase in yield than the single applications (.PO). The average % Difference for the dual applications was 22.3% and for the single applications was 14.3% showing that the dual applications on average produced greater increases in yield than the single applications on average.

Using formulations with an acid, carbon dioxide, and brown rice seed grind (Formulations C and D) produced a greater increase in yield on average than using formulations that contained only carbon dioxide and brown rice seed grind (Formulation F).

TABLE 1

Dry Panicle Weights per Container for Example 1

| Formulation.Application.Replicate | * Dry Weight of Panicles per Container (g) | Distance from Median | Average of Weights per Formulation (g) | Average of Weights without Outliers (g) |
|---|---|---|---|---|
| A.—.1 | 81.7 (O) | 12.6 | 72.5 | 67.9 |
| A.—.2 | 69.1 | 0 | | |
| A.—.3 | 66.7 | 2.4 | | |
| B.PO.1 | 78.3 | 0.2 | 78.9 | 78.9 |
| B.PO.2 | 79.9 | 1.4 | | |
| B.PO.3 | 78.5 | 0 | | |
| B.PT.1 | 76.4 | 0 | 77.5 | 74.0 |
| B.PT.2 | 84.5 (O) | 8.1 | | |
| B.PT.3 | 71.6 | 4.8 | | |
| C.PO.1 | 73.7 | 0 | 75.3 | 71.8 |
| C.PO.2 | 82.2 (O) | 8.5 | | |
| C.PO.3 | 69.9 | 3.8 | | |
| C.PT.1 | 89.2 | 0 | 89.2 | 89.2 |
| C.PT.2 | 82.1 | 7.1 | | |
| C.PT.3 | 96.4 | 7.2 | | |
| D.PO.1 | 80.0 | 0 | 75.9 | 80.2 |
| D.PO.2 | 80.3 | 0.3 | | |
| D.PO.3 | 67.4 (O) | 12.6 | | |
| D.PT.1 | 60.9 (O) | 21.9 | 75.9 | 83.4 |
| D.PT.2 | 83.9 | 1.1 | | |
| D.PT.3 | 82.8 | 0 | | |
| E.PO.1 | 68.0 | 4.8 | 75.7 | 70.4 |
| E.PO.2 | 86.2 (O) | 13.4 | | |
| E.PO.3 | 72.8 | 0 | | |
| E.PT.1 | 102.9 (O) | 18.7 | 88.4 | 81.2 |
| E.PT.2 | 78.1 | 6.1 | | |
| E.PT.3 | 84.2 | 0 | | |
| F.PO.1 | 60.9 (O) | 18.0 | 74.1 | 80.7 |
| F.PO.2 | 82.4 | 3.5 | | |
| F.PO.3 | 78.9 | 0 | | |
| F.PT.1 | 78.3 | 5.5 | 83.1 | 83.1 |
| F.PT.2 | 87.1 | 3.3 | | |
| F.PT.3 | 83.8 | 0 | | |
| G.PO.1 | 81.9 | 0 | 78.0 | 83.4 |
| G.PO.2 | 84.8 | 2.9 | | |
| G.PO.3 | 67.2 (O) | 14.7 | | |
| G.PT.1 | 87.8 | 0.4 | 83.8 | 87.6 |
| G.PT.2 | 87.4 | 0 | | |
| G.PT.3 | 76.3 (O) | 11.1 | | |

* (O) means that it was treated as an outlier for calculating averages without outliers.

TABLE 2

Example 1 Adjusted Average Dry Panicle Weights per Container (Averages without Outliers)

| Formulation.Application | *Formulation Ingredients | Adjusted Average Panicle Weight per Container (g) | % Difference of Adjusted Average Weight per Container as Compared to Formulation A |
|---|---|---|---|
| A | Baseline | 67.9 | 0% |
| E.PO | $CO_2$ | 70.4 | 4% |

TABLE 2-continued

Example 1 Adjusted Average Dry Panicle Weights
per Container (Averages without Outliers)

| Formulation.Application | *Formulation Ingredients | Adjusted Average Panicle Weight per Container (g) | % Difference of Adjusted Average Weight per Container as Compared to Formulation A |
|---|---|---|---|
| C.PO | PA + SG + $CO_2$ | 71.8 | 6% |
| B.PT | PA + $CO_2$ | 74.0 | 9% |
| B.PO | PA + $CO_2$ | 78.9 | 16% |
| D.PO | SA + SG + $CO_2$ | 80.2 | 18% |
| F.PO | SG + $CO_2$ | 80.7 | 19% |
| E.PT | $CO_2$ | 81.2 | 20% |
| F.PT | SG + $CO_2$ | 83.1 | 22% |
| D.PT | SA + SG + $CO_2$ | 83.4 | 23% |
| G.PO | PA + SG + PS + $CO_2$ | 83.4 | 23% |
| G.PT | PA + SG + PS + $CO_2$ | 87.6 | 29% |
| C.PT | PA + SG + $CO_2$ | 89.2 | 31% |

*PA = Phosphoric Acid; SA = Sulfuric Acid; SG = Brown Rice Seed grind; PS = Powdered Sugar

TABLE 3

Averages of % Differences in Table 2

| | |
|---|---|
| Average of % Difference in Table 2 for Early Applications (.PO tests) | 14.3% |
| Average of % Difference in Table 2 for Applications both Early and Late (.PT tests) | 22.3% |
| Average of % Difference in Table 2 for Formulations with acid, carbohydrate, and carbon dioxide (Formulations C & D) | 21.7% |
| Average of % Difference in Table 2 for Formulations with carbohydrate and carbon dioxide but no acid (Formulation F) | 20.5% |

The % nitrogen and % carbon were measured in the rough rice for several of the tests.

These measurements are given in Table 4. These values and the total rough rice per container were used to calculate the total nitrogen uptake in the rough rice and the total carbon uptake in the rough rice. These values are shown in Table 5.

TABLE 4

Example 1 Nitrogen and Carbon Levels in Rough Rice

| *Formulation | % N in Rough Rice | % Difference in % N in Rough Rice as Compared to Baseline | % C in Rough Rice | % Difference in % C in Rough Rice as Compared to Baseline |
|---|---|---|---|---|
| CO219.RI.A.—.1 (O) | 1.29 | 0.0% | 38.2 | 0.0% |
| CO219.RI.B.PT.3 | 1.36 | 5.2% | 41.8 | 9.3% |
| CO219.RI.C.PT.3 | 1.26 | −2.3% | 38.90 | 1.8% |
| CO219.RI.C.PT.3 | 1.21 | −6.2% | 38.0 | −0.4% |
| CO219.RI.C.PT.1 | 1.29 | 0.0% | 39.10 | 2.3% |
| CO219.RI.D.PT.3 | 1.26 | −2.5% | 37.0 | −3.3% |
| CO219.RI.E.PT.3 | 1.20 | −6.7% | 36.6 | −4.1% |
| CO219.RI.E.PT.2 | 1.36 | 5.4% | 38.10 | −0.3% |
| CO219.RI.E.PT.3 | 1.21 | −6.2% | 37.60 | −1.6% |
| CO219.RI.F.PT.3 | 1.32 | 2.3% | 36.2 | −5.2% |
| CO219.RI.G.PT.2 | 1.27 | −1.6% | 41.9 | 9.6% |

*(O) Means that the yield was considered an outlier - see Table 1

TABLE 5

Example 1 Total Nitrogen and Total Carbon in Rough Rice

| Formulation | Total Nitrogen in Rough Rice (g) | % Difference in total N in Rough Rice as Compared to Baseline | Total Carbon in Rough Rice (g) | % Difference in Total Carbon in Rough Rice as Compared to Baseline | *Formulation Description |
|---|---|---|---|---|---|
| CO219.RI.A.—.1 | 1.05 | 0.0% | 31.2 | 0.0% | Baseline |
| CO219.RI.B.PT.3 | 0.97 | −7.8% | 29.9 | −4.2% | PA + CO2 |
| CO219.RI.C.PT.3 | 1.21 | 15.2% | 37.5 | 20.1% | PA + SG + CO2 |
| CO219.RI.C.PT.3 | 1.17 | 10.7% | 36.7 | 17.5% | |

TABLE 5-continued

Example 1 Total Nitrogen and Total Carbon in Rough Rice

| Formulation | Total Nitrogen in Rough Rice (g) | % Difference in total N in Rough Rice as Compared to Baseline | Total Carbon in Rough Rice (g) | % Difference in Total Carbon in Rough Rice as Compared to Baseline | *Formulation Description |
|---|---|---|---|---|---|
| CO219.RI.C.PT.1 | 1.15 | 9.2% | 34.9 | 11.7% | |
| CO219.RI.D.PT.3 | 1.04 | −1.2% | 30.6 | −2.0% | SA + SG + CO2 |
| CO219.RI.E.PT.3 | 1.01 | −3.9% | 30.9 | −1.2% | CO2 |
| CO219.RI.E.PT.2 | 1.06 | 0.8% | 29.8 | −4.7% | |
| CO219.RI.E.PT.3 | 1.02 | −3.3% | 31.7 | 1.4% | |
| CO219.RI.F.PT.3 | 1.11 | 4.9% | 30.4 | −2.7% | SG + CO2 |
| CO219.RI.G.PT.2 | 1.11 | 5.2% | 36.6 | 17.3% | PA + SG + PS + CO2 |

*PA—Phosphoric Acid; SG—Brown Rice Seed grind; SA—Sulfuric Acid

TABLE 6

Comparison of % Differences in Average Yield per Container Compared to Baseline for .PO and .PT Tests

| Formulation.Application | *Formulation Ingredients | % Difference of Adjusted Average Weight per Container as Compared to Formulation A | |
|---|---|---|---|
| | | .PO | .PT |
| A | Baseline | 0% | |
| B | PA + $CO_2$ | 16% | 9% |
| C | PA + SG + $CO_2$ | 6% | 31% |
| D | SA + SG + $CO_2$ | 18% | 23% |
| E | $CO_2$ | 4% | 20% |
| F | SG + $CO_2$ | 19% | 22% |
| G | PA + SG + PS + $CO_2$ | 23% | 29% |

Table 5 shows that the total nitrogen uptake for the rice grown with formulations that contained carbohydrate and carbon dioxide were consistently higher than the baseline showing that the invention improved nitrogen efficiency than applying carbon dioxide alone.

The comparison in Table 6 of percent difference in yields for the tests that received only early application of the invention (.PO tests) and the tests that received both early application and late applications shows that in general, there is very little % difference in yield between the .PO and the .PT tests for most of the formulations. This demonstrates that the invention is most important in improving the early growth of plants and this early growth leads to improved yields.

Figure 2:
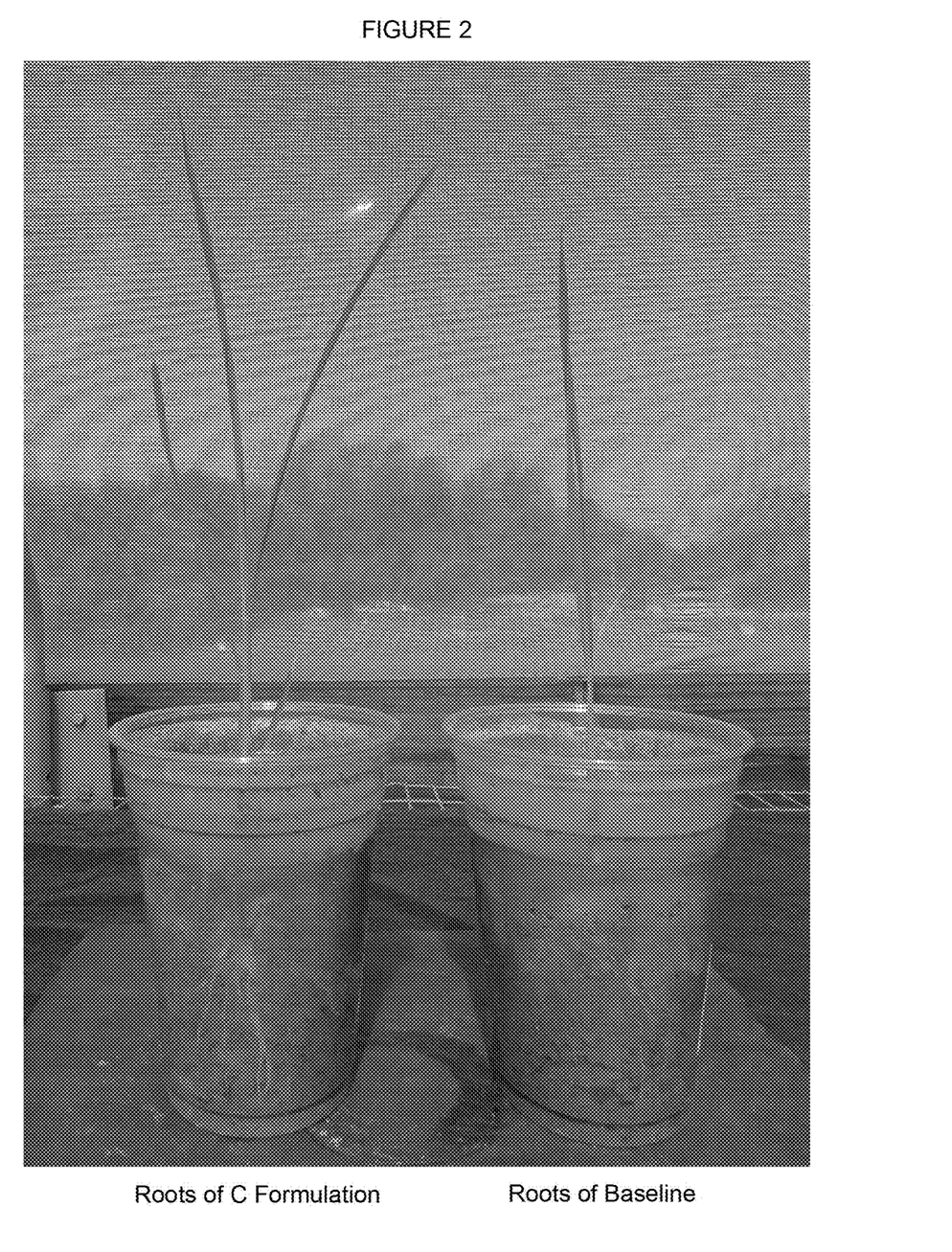
FIG. 2—Annotated photograph showing Example 1 early plant and root development.

FIG. 2 shows the dramatic difference in early plants of Example 1 given the C Formulation and of a Baseline plant. As can be seen by comparing the plant and roots in the picture, the roots of the plant receiving carbon dioxide, brown rice seed grind, and phosphoric acid (Formulation C) were more plentiful than the roots for the baseline plant that were not given any of these (A). The early plants for Formulation C were also larger and healthier than the Baseline plants. Plants that have improved early growth continue to outperform plants without improved early growth.

Example 2

Example 2 tests were conducted to test whether carbon dioxide alone delivered to the roots of rice plants improves the rough rice yield and the root growth. For this example *Oryza sativa* long grain rice variety LaKast™ seed treated with CruiserMaxx® (an insecticide and fungicide) was carefully selected as representative of all rice grown commercially and provides an excellent model for testing commercial rice.

As will be shown by the data results for Example 2 the following are concluded:

At 24 days of growth, the roots for plants receiving 2.0% $CO_2$ in air bubbled into the root zone showed a 65% increase in mass over the roots of the plants receiving either air alone or 0.5% $CO_2$ in air (see Table 6). Hence, introducing elevated carbon dioxide to the roots improves the early formation of plant roots.

The average root weights at harvest were higher for all of the containers of plants receiving elevated carbon dioxide at their roots than for those receiving just air at their roots (see Table 7). Hence the benefit of carbon dioxide gas delivered to the roots of rice plants continues through the entire growing season.

The grain yields for rice plants receiving elevated carbon dioxide were higher than the plants receiving just air with the exception of the containers receiving the highest level of carbon dioxide at 5.0% carbon dioxide mixed with air. This indicates that providing carbon dioxide to the roots of rice plants increases the yield of grain with the possible exception of an upper concentration of carbon dioxide.

For the Example 2 tests, carbon dioxide diluted with air in selected amounts was bubbled into the root zone of paddy rice. The rice was planted in 18.9 L (5 gallon) containers which are 30.5 cm (12 inches) in diameter and 35.6 cm (14 inches) deep, and sets of 8 containers all received the same gas mixture. The tests were designed to end after 17 weeks, but some containers were removed earlier to visually check the roots for amount of growth.

For the Example 2 tests, the following gas mixtures were used: Air
  0.2% carbon dioxide in air
  0.5% carbon dioxide in air
  1.0% carbon dioxide in air
  2.0% carbon dioxide in air
  5.0% carbon dioxide in air
  Note: 0.2% is approximately 5 times the amount of carbon dioxide currently found naturally in air 18.9 L (5 gallon) containers were prepared by placing an aquatic gas diffuser attached to tubing at the bottom of each container and then filling the container 10.2 cm (4 inches) from the top with sieved top soil. The containers were placed on tables in a greenhouse in groups of eight so that all received approximately the same amount of light. Each group of eight containers was attached to a tank of gas with the gas being supplied through a regulator to a flow meter and then to a set of eight valves with each one controlling the gas mixture to a single container. A total of forty-eight containers were prepared, and twenty-four containers were placed on each table. Starter phosphorus was added to the soil by mixing 1.7 g of triple super phosphate into the top 7.6 cm (3 inches) of soil in each container. Soil was also given addition starter fertilizer by dissolving 150 g of urea (for nitrogen), 132 g of potassium chloride (for potassium), and 1236 g of Epsom salts (magnesium sulfate heptahydrate for magnesium) in 12 liters of water. Each container was then given 200 mL of this solution. Later, zinc was added using zinc sulfate. The containers were flooded to 1.3 cm (0.5 inches) above the surface of the soil using collected rainwater. On May 20, 2016, the rice seed was presoaked for 24 hours and then drained for 24 hours was dropped on the surface of the soil in each container. After the rice was established, the plants were thinned to 10 plants per container. At a later date, the plants were thinned again to six plants per container. The gas mixtures to the containers were started on May 20, 2016 and adjusted to an initial flow meter setting of 42.5 liters/hr. (1.5 ft$^3$/hr.) with a steady flow of bubbles in each container. The flow rate was turned down to 14.2 liters/hr. (0.5 ft$^3$/hr.) on Jun. 14, 2016. The gas flow was supplied each weekday from 8:00 am to noon. During the testing, fans in the greenhouse created a constant airflow to prevent carbon dioxide concentration around a particular group of plants.

On May 25, 2016, 10.6 g of zinc sulfate was dissolved in 10 L of water and each container was given 200 mL of this solution. As the plants grew, the flood waters were gradually raised until they reached a depth of three inches above the soil surface. A flood water depth of 5.1 to 7.6 cm (2 to 3 inches) was maintained for the remainder of the test. On Jun. 13, 2016, one front container (containing 10 plants each) for each level of carbon dioxide was withdrawn for measurement and the plants were gently removed and thoroughly cleaned. The plants and roots were then dried in an oven overnight at 80° C. The next day, the roots were trimmed and weighed. Table 6 presents the total root weights and total foliage weights of the ten plants for each container of plants. The weight of the foliage for each of the containers receiving elevated carbon dioxide was slightly more than the weight of the foliage for the container receiving soley air.

As seen in Table 6, the roots for the plants receiving 2.0% $CO_2$ in air showed a significant increase in dry mass over the plants having less carbon dioxide bubbled into their root zone. This demonstrates that introducing carbon dioxide to the roots does improve the early formation of plant roots.

Also, the percent nitrogen in the rice foliage was measured for the plants on day 24 and these results are also presented in Table 6.

TABLE 6

Root Weights and Foliage Nitrogen Uptake for Example 2 Rice Plants at 24 Days

| % $CO_2$ | Dry Root Weight (g) | % Difference of Root Weight as Compared to Air | Dry Foliage Weight (g) | Total Nitrogen Uptake by Foliage (g) | % Difference in Total Nitrogen Uptake |
|---|---|---|---|---|---|
| Air | 1.26 | Baseline | 3.14 | 0.144 | Baseline |
| 0.5% | 1.26 | 0% | 3.48 | 0.156 | 8.33% |
| 2.0% | 2.08 | +65.1% | 3.43 | 0.151 | 4.86% |

On Jun. 20, 2016, the rice plants of Example 2 were thinned to six plants per container. On Aug. 1, 2016, additional nitrogen and triple super phosphate (TSP) was added to each container at the rate of 0.57 g TSP in all containers, 0.87 g of urea per container being fed normal air, and 2.27 g ammonium bicarbonate (equivalent nitrogen content as 0.87 g of urea) for the rest of the containers. This introduction of nitrogen and phosphates was to ensure no limitation in nitrogen and phosphorus for the plants and therefore ensure the testing validity of introducing carbon dioxide as a gas to the roots of the plants.

The rough rice for the Example 2 tests was harvested on Sep. 19, 2016. The rough rice was separated, and dried for seven days at 40° C. After the rice was collected from each plant, two containers from each set were selected to have their roots thoroughly rinsed, dried, and weighed. The resulting average weights of these roots are in Table 7 and show that the root weights were higher for all containers with plants receiving elevated carbon dioxide.

TABLE 7

Example 2 Average Root Weights at Harvest

| % $CO_2$ | Dry Root Weight (g) | % Difference |
|---|---|---|
| Air | 46.0 | Baseline |
| 0.2 | 62.5 | +35.8% |
| 0.5 | 49.0 | +6.4% |
| 1.0 | 50.4 | +9.6% |
| 2.0 | 51.1 | +11.1% |
| 5.0 | 55.5 | +20.7% |

The dry weights for the rough rice yields from the Example 2 tests are shown in Table 8. With the exception of the containers receiving 5.0% carbon dioxide mixed with air, all of the yields for rice plants receiving elevated carbon dioxide were higher than the plants receiving just air.

TABLE 8

Example 2 Rough Rice Yields

| % $CO_2$ | Yield Weight (g) | % Difference |
|---|---|---|
| Air | 88.9 | Baseline |
| 0.2% | 91.5 | 2.9% |
| 0.5% | 94.3 | 6.1% |
| 1.0% | 99.5 | 11.9% |
| 2.0% | 99.5 | 11.9% |
| 5.0% | 86.2 | −3.0% |

Overall, the tests of Example 2 demonstrate that supplying carbon dioxide at the plant roots increases yield and promotes root growth.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

The invention claimed is:

1. A method of enhancing growth of plants comprising:
applying a plant growth enhancer comprising a source of carbon dioxide, a source of acid in an amount to increase retention of carbon dioxide released from the source in soil and increase the availability of carbon dioxide to the plant, and a source of carbohydrate to soil containing a plant, wherein the source of carbohydrate comprises a seed grind; and
allowing the source of carbon dioxide to release carbon dioxide to the plant and soil, and source of acid to reduce the pH to increase retention of the carbon dioxide in the soil, wherein the carbon dioxide and carbohydrate provide enhanced growth to the plant, increased yield of the plant, improved efficiency of nitrogen uptake by the plant, improved nitrogen levels in the plant, and increased plant uptake of carbon by the plant.

2. The method according to claim 1, further comprising enhancing the growth of rice.

3. The method according to claim 2, further comprising using brown rice seed grind as the source of carbohydrate.

4. The method according to claim 1, wherein the plant is a seed or seedling.

5. The method according to claim 1, further comprising applying the plant growth enhancer beneath the soil from about 0.5 to about 10 inches deep to apply the growth enhancer to roots of the plant.

6. The method according to claim 1, wherein the plant growth enhancer is moved under the soil by use of water or mechanical incorporation.

7. The method according to claim 1, further comprising measuring nitrogen in the soil, and adding fertilizer to the soil to raise nitrogen levels to an acceptable level before applying the plant growth enhancer.

8. The method according to claim 1, further comprising conducting additional applications of the plant growth enhancer after a first application.

9. The method according to claim 1, wherein the plant growth enhancer is applied to paddy rice seedlings at a carbon dioxide level of 10 g/m$^2$ to 100 g/m$^2$ with or after planting the seed and prior to transplanting the plants.

10. The method according to claim 1, wherein the plant growth enhancer is applied to paddy rice in a field at a carbon dioxide level of 5 kg/hectare to 50 kg/hectare either just before, at, or after the paddy rice is transplanted.

11. The method according to claim 1, wherein a ratio of a weight of the source of carbon dioxide to a weight of source of carbohydrate is between 10:1 and 0.5:1.

12. The method according to claim 1, wherein the source of acid is present in amount to a provide pH of between 4.5 and 6 measured by forming an aqueous solution of the source of carbon dioxide, the source of acid, and the source of carbohydrate.

13. The method according to claim 1, wherein the plant growth enhancer is in solid, semi-solid, or liquid form.

14. The method according to claim 1, wherein the carbon dioxide comprises at least one of dry ice, carbon dioxide gas, liquid carbon dioxide, a solution of carbon dioxide, a suspension containing carbon dioxide, or a slurry containing carbon dioxide.

15. The method according to claim 1, wherein the carbon dioxide comprises dry ice.

16. The method according to claim 1, wherein the source of carbohydrate comprises at least one of seed grind, starch, or sugar.

17. The method according to claim 1, wherein the source carbohydrate is a seed grind formed from a same type of plant to be grown.

18. The method according to claim 1, wherein source of acid comprises at least one of phosphoric acid, sulfuric acid, nitric acid, hydrochloric acid, or an organic acid.

19. The method according to claim 1, further comprising using a seed grind formed from whole wheat seeds as the source of carbohydrate.

20. The method according to claim 1, further comprising using a seed grind formed from whole corn seeds as the source of carbohydrate.

21. The method according to claim 1, wherein the seed grind comprises seed grind particles and 95% of the seed grind particles by weight are between 44 micrometers (325 ISO sieve designation) and 2.00 mm (10 ISO sieve designation).

22. The method according to claim 1, wherein the seed grind comprises seed grind particles and 90% of the seed grind particles by weight are between 63 micrometers (230 ISO sieve designation) and 2.00 mm (10 ISO sieve designation).

23. The method according to claim 1, further comprising testing the soil for deficiencies in one or more nutrients and applying a starter fertilizer that contains nitrogen with other primary nutrients, secondary nutrients, and micronutrients at the levels indicated by soil tests, wherein the starter fertilizer is applied at, before, or just after planting and prior to application of the plant growth enhancer to the soil.

24. The method according to claim 1, wherein the plant is a crop selected from the group consisting of rice, wild rice, sugar cane, water chestnuts, lotus, taro, water spinach, watercress, water celery, arrowroot, sago palm, nipa palm, marsh-type grasses, fen grasses, bald cypress and *eucalyptus*.

25. The method according to claim 1, wherein the plant is a crop selected from the group consisting of corn, cotton, wheat, soybeans, cassava, sugar beets, and energy grasses.

26. The method according to claim 1, wherein the plant is selected from trees, bushes, ornamental plants, vegetables, fruits, and vines.

27. The method according to claim 1, wherein a first application the plant growth enhancer is applied when a seed is planted and at least one more application of the plant growth enhancer is applied between 2 weeks and 8 weeks after the seed is planted.

28. The method according to claim 1, wherein the plant growth enhancer is not a fertilizer and is substantially free of nitrogen fertilizers.

29. The method according to claim 1, wherein the source of acid is phosphoric acid in an amount to reduce the pH to 5.7.

30. The method according to claim 1, wherein the plant growth enhancer provides a synergistic increase in crop yield, improved efficiency of nitrogen uptake by the plant, improved nitrogen levels in plant products, and increased plant uptake of carbon dioxide.

31. The method according to claim 1, wherein the plant growth enhancer provides carbon dioxide and energy to roots of the plant before the plant grows leaves.

32. The method according to claim 1, wherein the source of carbon dioxide is dry ice, the seed grind is formed from brown rice, and the plant growth enhancer is in the form of a powder, flakes or pellets.

33. The method according to claim 1, wherein the plant is rice and the plant growth enhancer provides an increase in crop yield of 60% or more, an increase in carbon uptake of 60% or more, an increase in nitrogen uptake of 60% or more, and an increase of protein levels of 10% or more compared to the plant grown without the plant growth enhancer.

\* \* \* \* \*